US012343997B2

(12) United States Patent
Hara

(10) Patent No.: US 12,343,997 B2
(45) Date of Patent: Jul. 1, 2025

(54) INKJET RECORDER

(71) Applicant: Konica Minolta, Inc., Tokyo (JP)

(72) Inventor: Takahiro Hara, Tama (JP)

(73) Assignee: KONICA MINOLTA, INC., Tokyo (JP)

( * ) Notice: Subject to any disclaimer, the term of this patent is extended or adjusted under 35 U.S.C. 154(b) by 133 days.

(21) Appl. No.: 18/320,288

(22) Filed: May 19, 2023

(65) Prior Publication Data

US 2023/0382119 A1 Nov. 30, 2023

(30) Foreign Application Priority Data

May 30, 2022 (JP) ................................ 2022-087551

(51) Int. Cl.
*B41J 2/17* (2006.01)
*B41J 2/175* (2006.01)

(52) U.S. Cl.
CPC .......... *B41J 2/1714* (2013.01); *B41J 2/17563* (2013.01)

(58) Field of Classification Search
CPC ...................................................... B41J 2/1721
See application file for complete search history.

(56) References Cited

U.S. PATENT DOCUMENTS 9,242,474 B2 1/2016 Kobayashi et al.

FOREIGN PATENT DOCUMENTS

JP 2014151642 A 8/2014
JP 2021084247 A * 6/2021

OTHER PUBLICATIONS

Goto, Machine TranslationofJP-2021084247-A, 2021 (Year: 2021).*

* cited by examiner

*Primary Examiner* — Scott A Richmond
(74) *Attorney, Agent, or Firm* — CANTOR COLBURN LLP

(57) ABSTRACT

A mist collector includes: a nozzle through which air is sucked from a suction port and discharged from a discharge port; and a cyclone including an outer cylinder and an inner cylinder. The inner cylinder includes an intake hole and forms an airflow inside the inner cylinder by air taken therein through this intake hole, thereby separating ink mist from the air.

14 Claims, 14 Drawing Sheets

INKJET RECORDER

CROSS REFERENCES TO RELATED APPLICATIONS

The present invention claims priority under 35 U.S.C. § 119 to Japanese Application, 2022-087551, filed on May 30, 2022, the entire contents of which being incorporated herein by reference.

BACKGROUND

Technological Field

The present invention relates to an inkjet recorder.

Description of the Related Art

An inkjet recorder is an apparatus that causes ink ejected by an inkjet head to adhere on a recording medium thereby forming an image on the recording medium. Not all the ink ejected by the inkjet head contributes to an image formation, and a part thereof floats as ink mist.

The ink mist is a microdroplet of ink and hence is easily flown by the surrounding airflow. If the ink mist flowed by the airflow goes out of its predetermined trajectory and adheres to the recording medium, a deterioration in image quality is resulted. Moreover, if the ink mist adheres to an area other than the recording medium, an ink contamination occurs in the inkjet recorder. Therefore, the inkjet recorder includes a mist collector that collects the ink mist.

Patent Literature 1 describes a technique in which ink mist moving with an airflow is separated from the air by a centrifugal force and then collected. In the technique described in Patent Literature 1, a spiral airflow is generated inside a cyclone housing, and the ink mist is caused to adhere on the inner wall of the cyclone housing by a centrifugal force generated at the time when the ink mist moves in circles with this airflow, so that the ink mist is separated from the air.

RELATED ART LITERATURE

Patent Literature

Patent Literature 1: JP 2014-151642 A

SUMMARY

The ink mist is generated at the time when the ink is ejected from the inkjet head, but the particle size of the generated ink mist is uneven. In the technique described in Patent Literature 1, the ink mist not removed by the centrifugal cyclone is captured by a filter. In this case, the ink mist with a smaller particle size is required to be separated from the air before the ink mist arrives the filter in order to reduce the exchange frequency of filters.

The present invention has been made to solve the problem described above, and an object of the present invention is to provide an inkjet recorder with which the collection efficiency of ink mist by a cyclone can be enhanced.

The present invention is an inkjet recorder including a mist collector that collects ink mist, the mist collector includes: a nozzle through which air containing the ink mist is sucked from a suction port and discharged from a discharge port; and a cyclone that includes an outer cylinder to which the discharge port of the nozzle is connected and an inner cylinder disposed inside the outer cylinder, the cyclone forming a first airflow between the outer cylinder and the inner cylinder by the air taken into the outer cylinder through the discharge port thereby separating the ink mist from the air. The inner cylinder includes an intake hole through which air is taken into the inner cylinder and forms a second airflow inside the inner cylinder by the air taken thereinto through the intake hole, thereby separating the ink mist from the air.

According to embodiments of the present invention, the collection efficiency of the ink mist by the cyclone can be enhanced.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
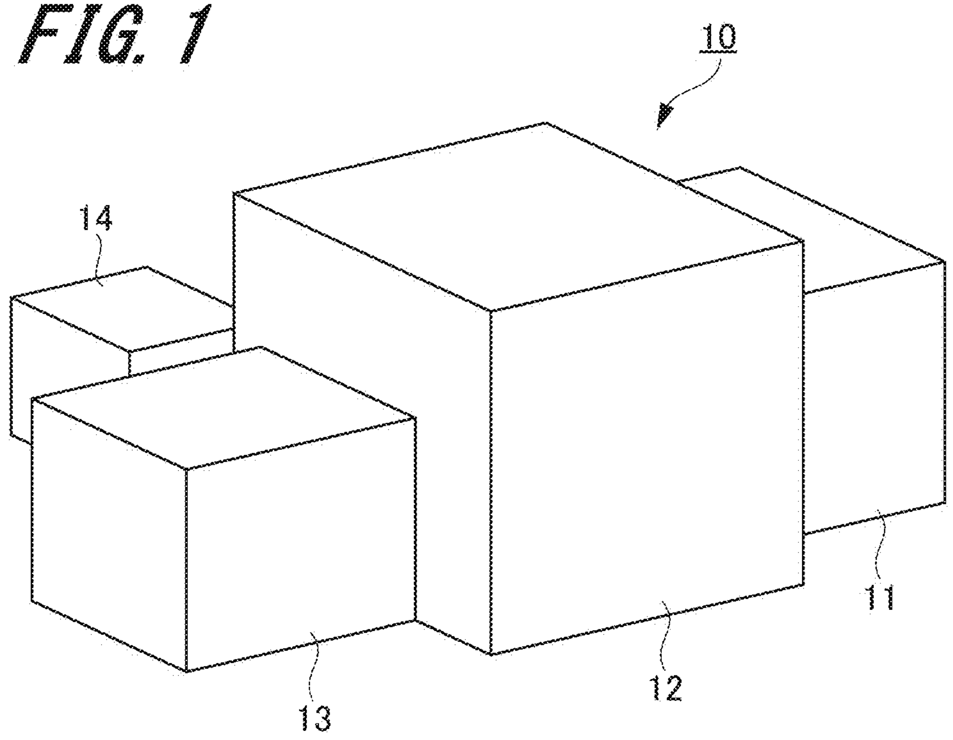
FIG. 1 is a schematic perspective view of an inkjet recorder according to an embodiment of the present invention.

Hereinafter, one or more embodiments of the present invention will be described with reference to the drawings. However, the scope of the invention is not limited to the disclosed embodiments.

Hereinafter, the embodiments of the present invention will be described in detail with reference to the drawings. In the present specification and the attached drawings, elements having substantially the same function or configuration will be denoted by the same reference numerals, and redundant descriptions thereof will be omitted.

<Configuration of Inkjet Recorder>

FIG. 1 is a schematic perspective view of an inkjet recorder according to an embodiment of the present invention.

As illustrated in FIG. 1, the inkjet recorder 10 includes a paper feeder 11, an image former 12, a paper exit 13, and an ink supply tank 14. The paper feeder 11 is a part that supplies a sheet of paper as a recording medium. The recording medium is not limited to a sheet of paper and may be a sheet-like medium on which an image can be formed with use of ink. In a case where a sheet of paper is used as the recording medium, the sheet of paper may be cut paper or continuous paper. The continuous paper includes roll paper. In the present embodiment, cut paper is used as an example of the recording medium.

The image former 12 is a part that forms an image on a sheet of paper with use of ink. The paper exit 13 is a part that discharges a sheet of paper after an image has been formed thereon. The ink supply tank 14 is a tank that stores a predetermined amount of ink and supplies the ink to the image former 12.

Figure 2:
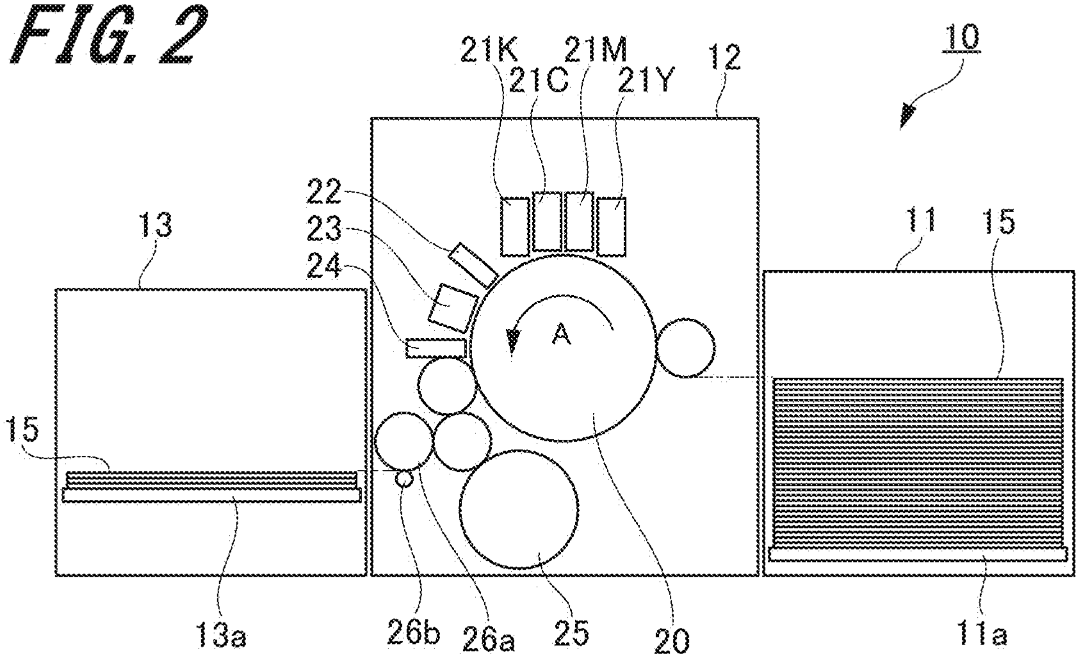
FIG. 2 is a schematic diagram illustrating an internal structure of the inkjet recorder illustrated in FIG. 1.

FIG. 2 is a schematic diagram illustrating an internal structure of the inkjet recorder illustrated in FIG. 1.

As illustrated in FIG. 2, the paper feeder 11 is provided with a paper feed tray 11*a*. In the paper feed tray 11*a*, there are stacked sheets of paper 15 before an image is formed thereon. The paper feeder 11 supplies the sheets of paper 15 separately one by one in order from the top stacked on the paper feed tray 11*a*.

The image former 12 is provided with a conveyor drum 20, a plurality of inkjet heads 21Y, 21M, 21C, and 21K, a mist collector 22, an ultraviolet irradiator 23, an in-line sensor 24, a reverser 25, and a large and a small conveyor rollers 26*a* and 26*b*.

The conveyor drum 20 is provided rotatably in direction A. The conveyor drum 20 rotates with the sheet of paper 15 supplied from the paper feeder 11 being wound around the outer peripheral surface of the conveyor drum 20 thereby conveying the sheet of paper 15. The conveyor drum 20 causes the sheet of paper 15 to be sucked on the outer peripheral surface of the conveyor drum 20 by air suction, for example, and rotates in this state thereby conveying the sheet of paper 15 in the direction A. The direction A indicated by an arrow in FIG. 2 is a rotation direction of the conveyor drum 20 and also a conveyance direction of the sheet of paper 15. In the following description, it may be described as the rotation direction A of the conveyor drum or may be described as the conveyance direction A of the sheet of paper 15.

The plurality of inkjet heads 21Y, 21M, 21C, and 21K form an image on the sheet of paper 15 with inks of their corresponding colors. Specifically, the inkjet head 21Y forms an image with yellow (Y) ink, and the inkjet head 21M forms an image with magenta (M) ink. The inkjet head 21C forms an image with cyan (C) ink, and the inkjet head 21K forms an image with black (K) ink. In the present embodiment, ultraviolet curable inks are used.

The inkjet heads 21Y, 21M, 21C, and 21K each are arranged in a state of facing the outer peripheral surface on the upper side of the conveyor drum 20. Also, the inkjet heads 21Y, 21M, 21C, and 21K each are arranged with its position shifted in the circumferential direction of the conveyor drum 20. Note that, in the present embodiment, the four inkjet heads 21Y, 21M, 21C, and 21K are provided in the image former 12 so that a color image can be formed with four color inks, but the number of inkjet heads may be other than four.

The mist collector 22 is a device that collects ink mist generated at the time when each of the inkjet heads 21Y, 21M, 21C, and 21K ejects ink. Most of the ink mist is caused to flow in the direction A by an airflow generated at the time when the conveyor drum 20 rotates. For this reason, the mist collector 22 is disposed on the downstream side of the inkjet head 21K in the rotation direction A of the conveyor drum 20.

The ultraviolet irradiator 23 is disposed on the downstream side of the mist collector 22 in the rotation direction A of the conveyor drum 20. The ultraviolet irradiator 23 irradiates the sheet of paper 15 conveyed by the rotation of the conveyor drum 20 with ultraviolet light thereby curing the ink on the sheet of paper 15.

The in-line sensor 24 is disposed on the downstream side of the ultraviolet irradiator 23 in the rotation direction A of the conveyor drum 20. The in-line sensor 24 is a sensor that inspects the color density, the inclination, and the like of an image formed on the sheet of paper 15 during conveyance by the conveyor drum 20. The reverser 25 is a part that reverses the front and back of the sheet of paper 15 in order to form images on both sides of the sheet of paper 15. The conveyor rollers 26*a* and 26*b* are rollers that convey the sheet of paper 15 after an image has been formed thereon toward the paper exit 13.

The paper exit 13 is provided with an exit tray 13*a*. In the exit tray 13*a*, there are stacked one on top of the other the sheets of paper 15 after an image has been formed thereon.

<Operation of Inkjet Recorder>

Next, the operation of the inkjet recorder 10 according to the present embodiment will be described.

First, the sheets of paper 15 stacked on the paper feed tray 11*a* of the paper feeder 11 are taken separately one by one in order from the top and supplied to the image former 12. The sheet of paper 15 supplied to the image former 12 is gripped at the tip of the sheet of paper 15 by a conveyance claw (not illustrated). The conveyance claw feeds the sheet of paper 15 to the conveyor drum 20 at a predetermined timing. As a result, the sheet of paper 15 is sucked on the outer peripheral surface of the conveyor drum 20, and the sheet of paper 15 is conveyed by the rotation of the conveyor drum 20.

On the other hand, the inkjet heads 21Y, 21M, 21C, and 21K each eject ink at each predetermined timing to the sheet of paper 15 conveyed by the rotation of the conveyor drum 20 thereby causing the ink to adhere on the sheet of paper 15. As a result, an image is formed on the sheet of paper 15. Thereafter, the sheet of paper 15 is irradiated with ultraviolet light by the ultraviolet irradiator 23. As a result, the ink that forms an image on the sheet of paper 15 is cured.

The sheet of paper 15 after an image has been formed thereon is then conveyed by the conveyor rollers 26*a* and 26*b*, thereby being sent to the paper exit 13. The sheet of paper 15 sent to the paper exit 13 is discharged one on top of the other on the exit tray 13*a*. Through the above operation, the sheet of paper 15 on which an image has been formed is obtained.

<Configuration of Mist Collector>

Next, a configuration of a mist collector included in an inkjet recorder according to an embodiment of the present invention will be described in detail.

Figure 3:
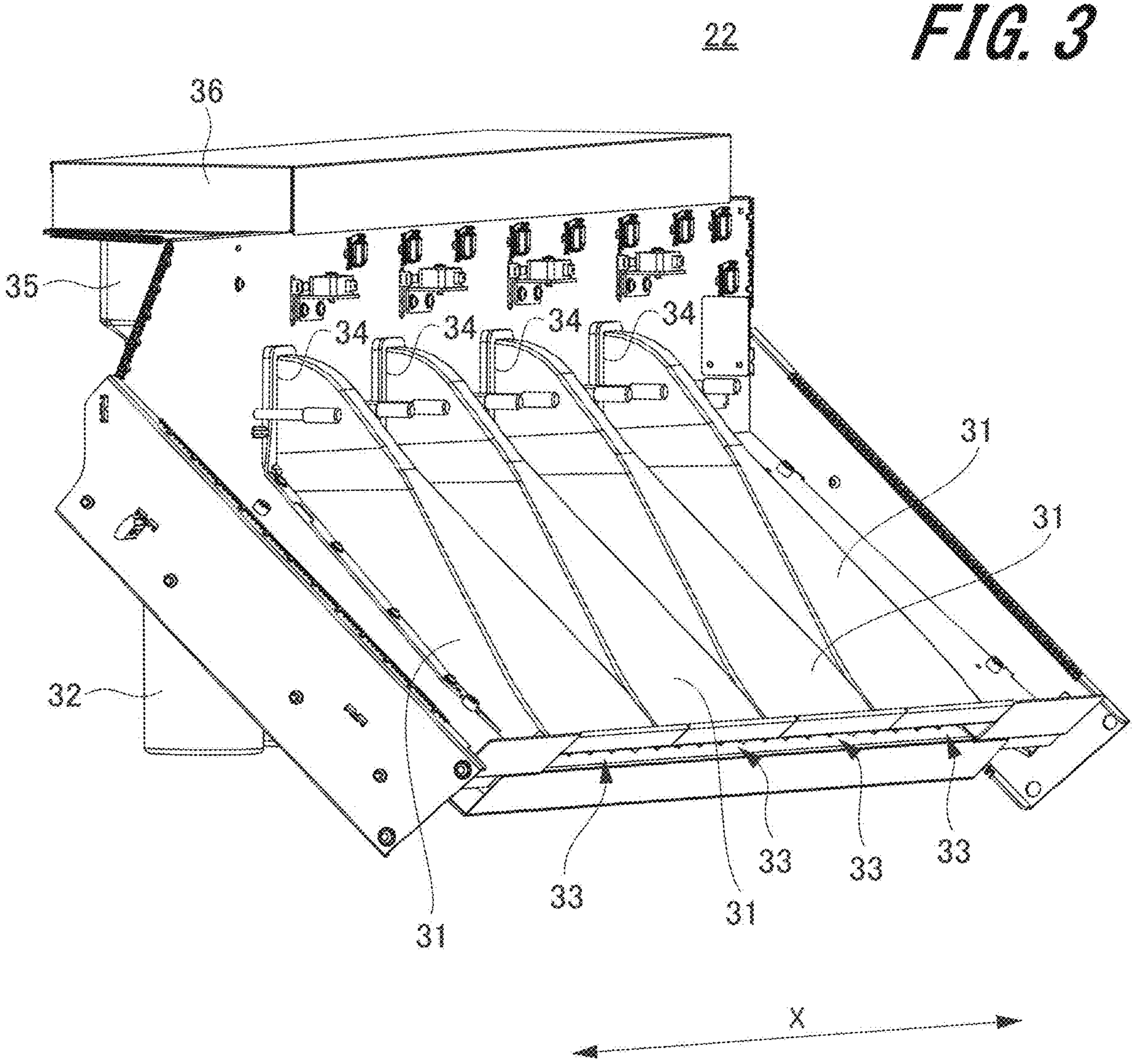
FIG. 3 is a perspective view of a mist collector according to the present embodiment as viewed from an upstream side in a paper conveyance direction.
Figure 4:
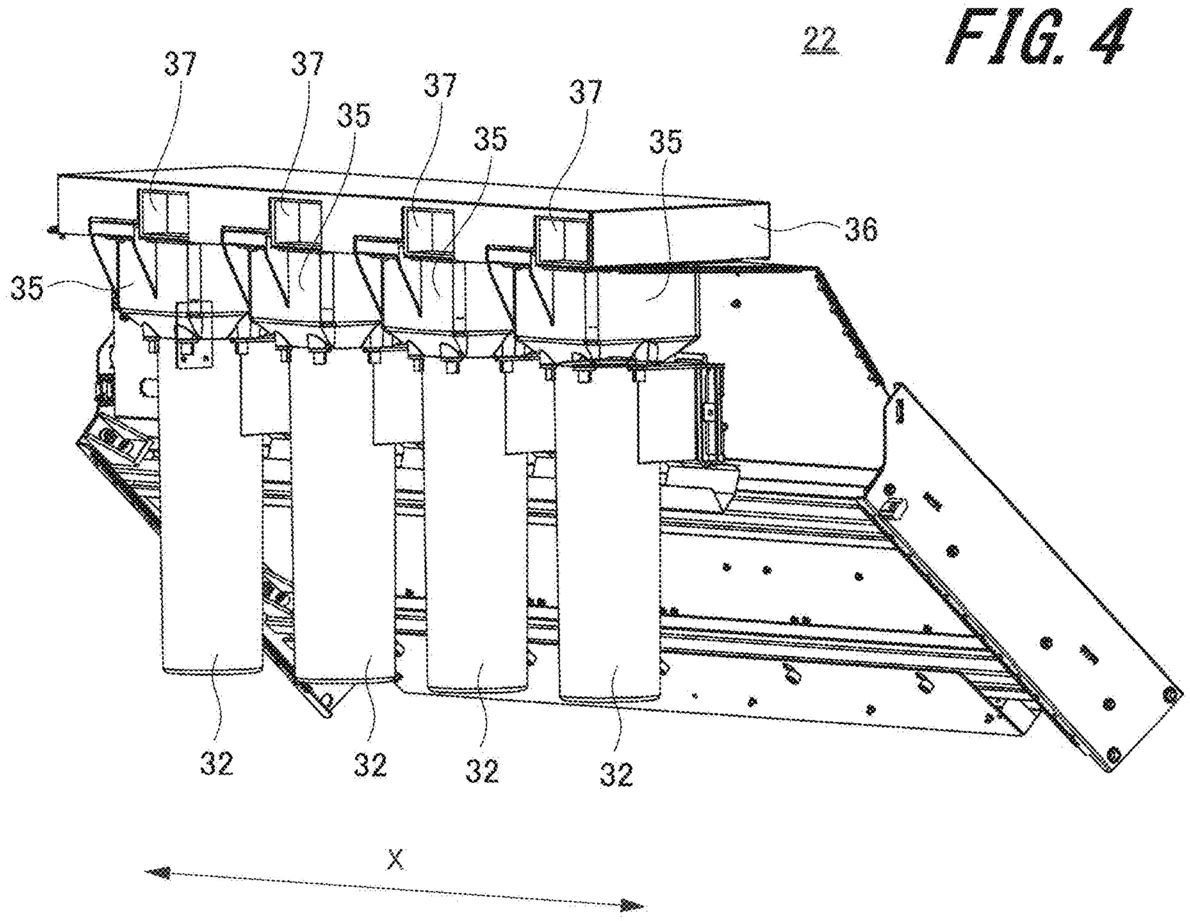
FIG. 4 is a perspective view of the mist collector according to the present embodiment as viewed from a downstream side in the paper conveyance direction.

FIG. 3 is a perspective view of the mist collector according to the present embodiment as viewed from the upstream side in the paper conveyance direction, and FIG. 4 is a perspective view of the mist collector according to the present embodiment as viewed from the downstream side in the paper conveyance direction.

As illustrated in FIG. 3 and FIG. 4, the mist collector 22 includes a plurality of nozzles 31 and a plurality of cyclones 32 both arranged side by side in a direction (hereinafter, also referred to as a "paper width direction") X orthogonal to the paper conveyance direction A (see FIG. 2). In the present embodiment, by way of example, four nozzles 31 and four cyclones 32 are provided.

The four nozzles 31 are arranged side by side in the paper width direction X. The nozzle 31 is a hollow member. The nozzle 31 is disposed in a state of being inclined with respect to the horizontal plane. The nozzle 31 includes a suction port 33. The suction port 33 is an opening through which air containing ink mist is sucked. The suction port 33 has a rectangular shape elongated in the paper width direction X, that is, it is open horizontally. The suction ports 33 of the four nozzles 31 are adjacent to each other in the paper width direction X.

Here, in the length direction of the nozzle 31, a nozzle end on a side where the suction port 33 is provided is defined as a tip of the nozzle 31, and a nozzle end on a side opposite to the suction port 33 is defined as a rear end of the nozzle 31. In such a case, the tip of the nozzle 31 is disposed at a position lower than the rear end of the nozzle 31, and the suction port 33 is open obliquely downward. The shape of the nozzle 31 is made to be a horizontally long shape at the tip of the nozzle 31 and a vertically long shape at the rear end of the nozzle 31. That is, the longitudinal sectional shape of the nozzle 31 changes gradually from a horizontally long shape to a vertically long shape from the tip toward the rear end of the nozzle 31. A discharge port 34 is provided at the rear end of the nozzle 31. The discharge port 34 is an opening through which the air sucked from the suction port 33 is discharged. The discharge port 34 is open vertically.

As with the nozzles 31, the four cyclones 32 are arranged side by side in the paper width direction X. The cyclone 32 is disposed in a state of standing vertically. The discharge port 34 of the nozzle 31 is connected to the top of the cyclone 32. The cyclone 32 centrifuges the ink mist from the air taken in through the nozzle 31.

Furthermore, the mist collector 22 includes four filter housings 35 and a fan cover 36. The filter housing 35 is disposed above the cyclone 32. A filter (not illustrated) is detachably attached to the filter housing 35. The fan cover 36 is a cover that covers four exhaust fans (not illustrated). The four filter housings 35 and the four exhaust fans each are provided corresponding to the four cyclones 32. The exhaust fan is provided as an example of an airflow generator. The airflow generator generates an airflow on a path from the nozzle 31 through the cyclone 32 to the filter. The fan cover 36 is provided with four exhaust ports 37 corresponding to the four exhaust fans. The exhaust port 37 is an opening through which air is discharged to the outside the device by rotational driving of the exhaust fan.

Hereinafter, the configurations of the nozzle 31, the cyclone 32, the filter housing 35, and the exhaust fan will be described in more detail.

Figure 5:
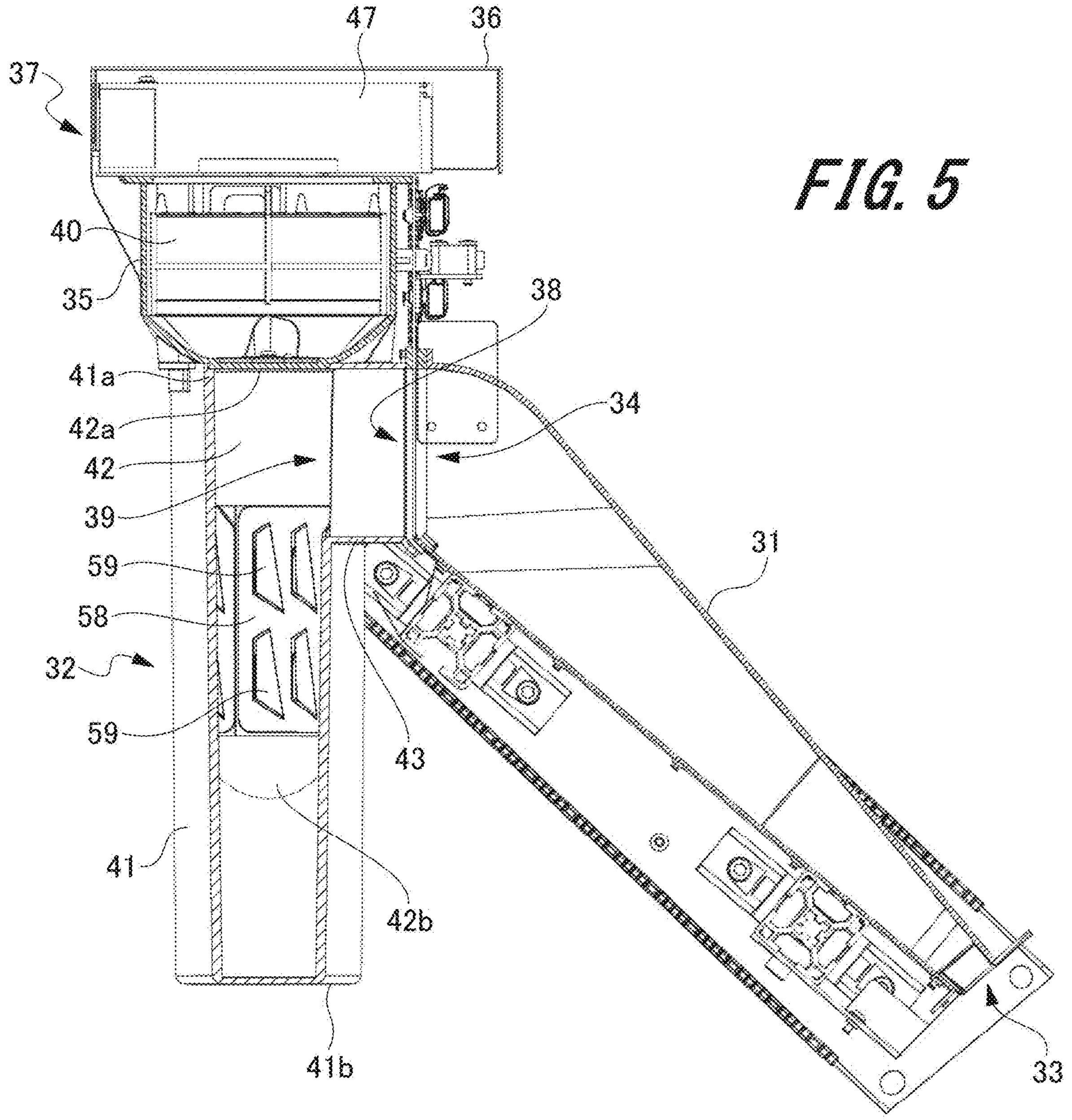
FIG. 5 is a longitudinal sectional view (part 1) of the mist collector according to the present embodiment.
Figure 6:
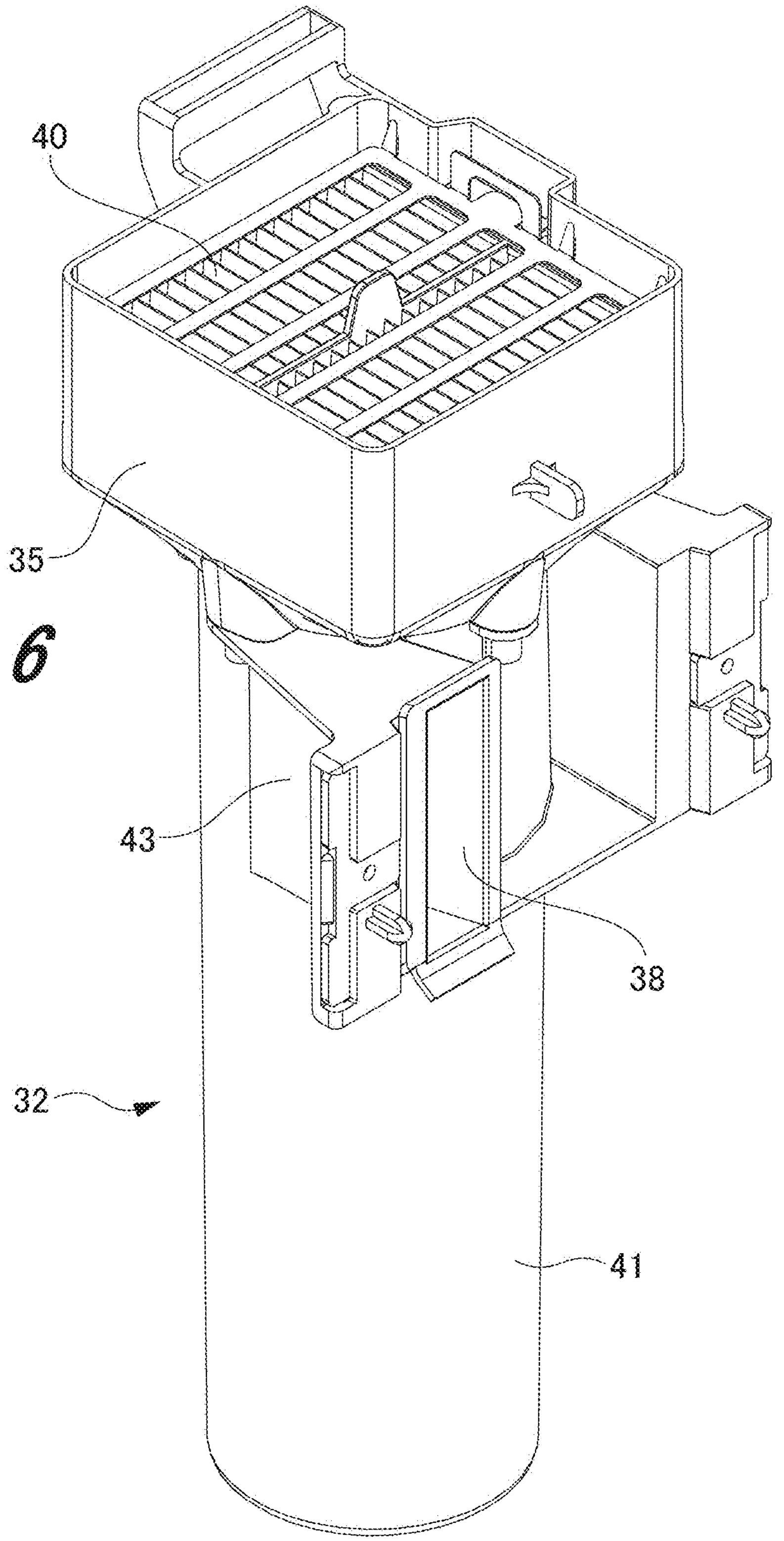
FIG. 6 is a perspective view illustrating a configuration of a cyclone and a filter unit included in the mist collector according to the present embodiment.

FIG. 5 is a longitudinal sectional view of the mist collector according to the present embodiment. FIG. 6 is a perspective view illustrating the configuration of the cyclone and the filter unit included in the mist collector according to the present embodiment.

As illustrated in FIG. 5, the discharge port 34 of the nozzle 31 is connected to an air inlet 38 of the cyclone 32. The air inlet 38 is an opening through which the air sucked from the suction port 33 of the nozzle 31 and discharged from the discharge port 34 is introduced into the cyclone 32. As with the discharge port 34 of the nozzle 31, the air inlet 38 is formed in a rectangular shape that is vertically long (FIG. 6).

The cyclone 32 includes an outer cylinder 41 and an inner cylinder 42. The outer cylinder 41 is preferably formed of a resin. The outer cylinder 41 is formed in a cylindrical shape. A top end 41*a* of the outer cylinder 41 is open, and a bottom end 41*b* of the outer cylinder 41 is closed. That is, the outer cylinder 41 is formed in a bottomed cylindrical shape. The top end 41*a* of the outer cylinder 41 is connected to the bottom end of the filter housing 35. The bottom end of the filter housing 35 is open so that air can be taken into the filter housing 35 from the top end of the cyclone 32. The filter 40 is housed in the filter housing 35. In a case where the air taken into the filter housing 35 from the cyclone 32 contains ink mist, the filter 40 captures this ink mist.

As illustrated in FIG. 5, an exhaust fan 47 is disposed above the filter housing 35. As described above, the exhaust fan 47 functions as an airflow generator. Specifically, a negative pressure occurs at the primary side of the exhaust fan 47 when the exhaust fan 47 is driven to rotate, and being pulled by this negative pressure, air is sucked from the suction port 33 of the nozzle 31. At this time, the exhaust fan 47 draws the air sucked from the suction port 33 of the nozzle 31 so as to pass through in order of the inside of the nozzle 31, the inside of the cyclone 32, and the inside of the filter housing 35, and then discharges the air from the exhaust port 37 to the outside of the device. As a result, a first airflow is formed in a first space 45, and a second airflow is formed inside the inner cylinder 42. The first airflow and the second airflow will be described in detail later.

The discharge port 34 of the nozzle 31 is connected to the outer cylinder 41. In more detail, an air induction 43 is formed on top of the outer cylinder 41. The air induction 43 is formed integrally with the outer cylinder 41. The air induction 43 is a part through which the air discharged from the discharge port 34 of the nozzle 31 is introduced into a space (hereinafter, also referred to as a "first space") 45 between the outer cylinder 41 and the inner cylinder 42. As illustrated in the transverse sectional view of FIG. 7, the air induction 43 includes an air inlet 38 and an air outlet 39. The air outlet 39 is an opening through which the air introduced from the air inlet 38 is let out toward the first space 45. The air induction 43 sends out air in a direction (tangential direction) along the peripheral wall 44 of the outer cylinder 41 in the transverse sectional view illustrated in FIG. 7. The discharge port 34 of the nozzle 31 is connected to the air inlet 38 of the air induction 43. As a result, the discharge port 34 of the nozzle 31 is connected to the top of the outer cylinder 41.

The inner cylinder 42 is preferably formed of a resin. The inner cylinder 42 is formed in a cylindrical shape. The inner cylinder 42 is disposed concentrically with the outer cylinder 41. That is, the central axis of the inner cylinder 42 and the central axis of the outer cylinder 41 are located on the same axis. The inside of the inner cylinder 42 is a space (hereinafter, also referred to as a "second space") 46. The second space 46 is surrounded by the peripheral wall 48 of the inner cylinder 42. The top end 42*a* of the inner cylinder 42 is open, and the bottom end 42*b* of the inner cylinder 42 is closed. The inner cylinder 42 is formed integrally with the filter housing by integral molding of a resin, for example. In this regard, however, the inner cylinder 42 may also be made as a separate body from the filter housing 35. The top end 42*a* of the inner cylinder 42 is open upward, and through this opening, the inside of the inner cylinder 42 and the inside of the filter housing 35 communicate with each other. The term "communication" refers to a state of being spatially connected.

Figure 8:
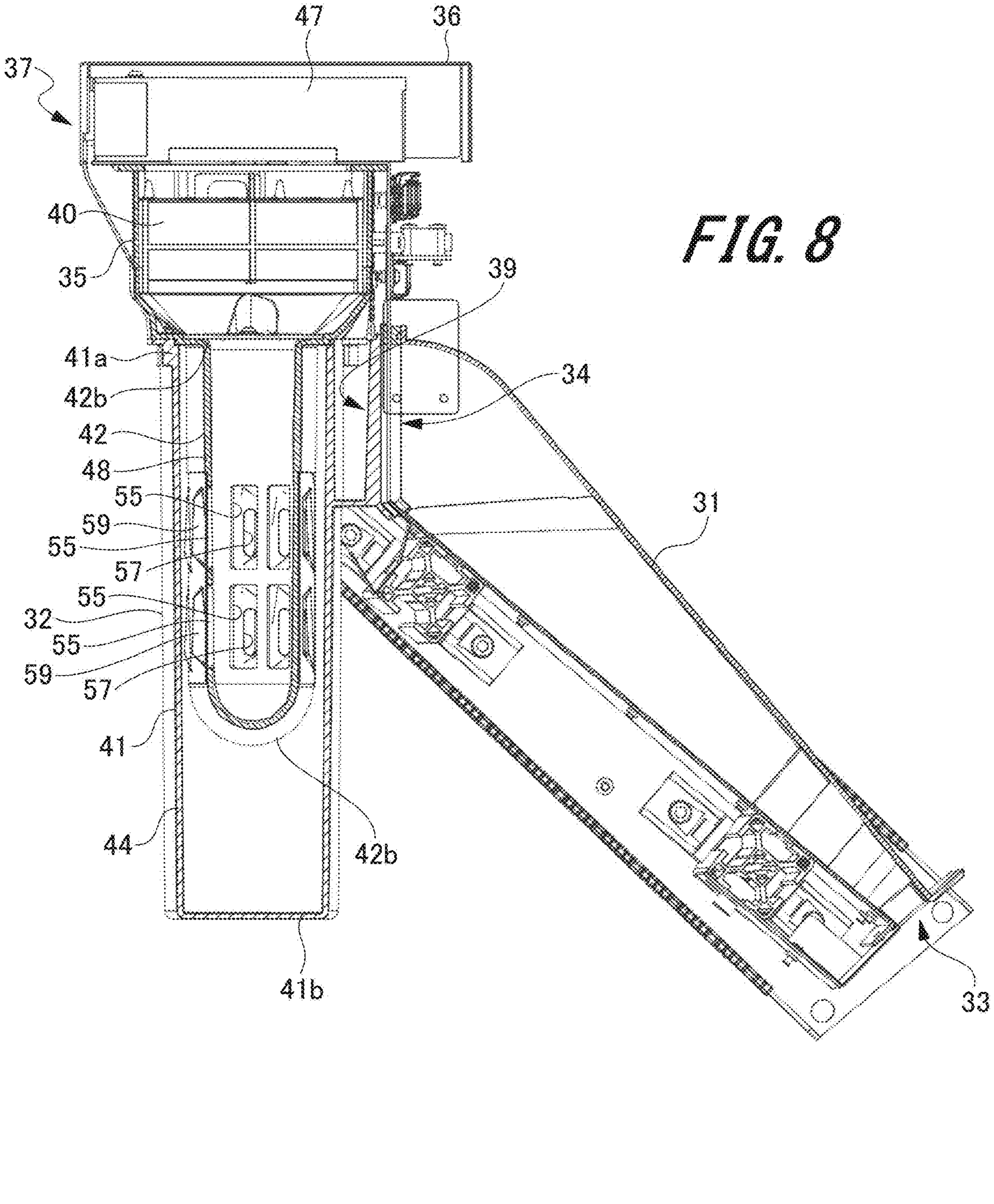
FIG. 8 is a longitudinal sectional view (part 2) of the mist collector according to the present embodiment.

As illustrated in FIG. 8, the top end 42*a* of the inner cylinder 42 is disposed at nearly the same height position as that of the top end 41*a* of the outer cylinder 41. In contrast, the bottom end 42*b* of the inner cylinder 42 is disposed at a position higher than that of the bottom end 41*b* of the outer cylinder 41. In other words, the length of the inner cylinder 42 in the central-axis direction is shorter than the length of the outer cylinder 41 in the central-axis direction. The bottom end 42*b* of the inner cylinder 42 is formed in a downward hemispherical shape. This contributes to a smoother stream of air that forms a first airflow 61 described later thereby enabling to suppress a decrease in wind speed.

Figure 9:
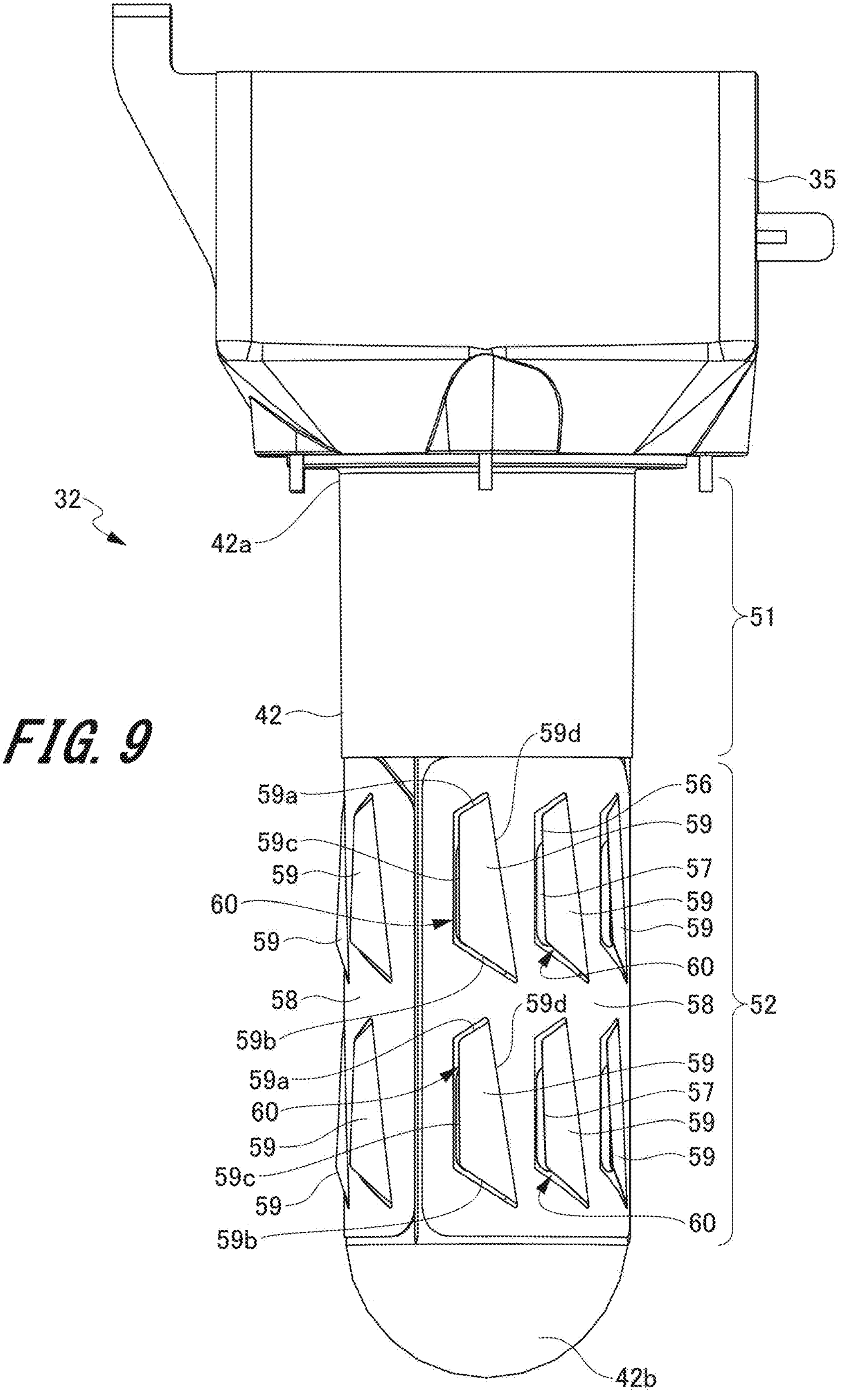
FIG. 9 is a side view illustrating a state in which the outer cylinder of the cyclone is removed so that the inner cylinder of the cyclone can be seen.

FIG. 9 is a side view illustrating a state in which the outer cylinder of the cyclone is removed so that the inner cylinder of the cyclone can be seen.

As illustrated in FIG. 9, the inner cylinder 42 of the cyclone 32 is sectioned into a first tube 51 and a second tube 52 in the central axis direction of the inner cylinder 42. The first tube 51 is a part including the top end 42*a* of the inner cylinder 42. The second tube 52 is a part located between the first tube 51 and the bottom end 42*b* of the inner cylinder 42. The first tube 51 and the second tube 52 are both formed by the peripheral wall 44 of the inner cylinder 42.

Figure 10:
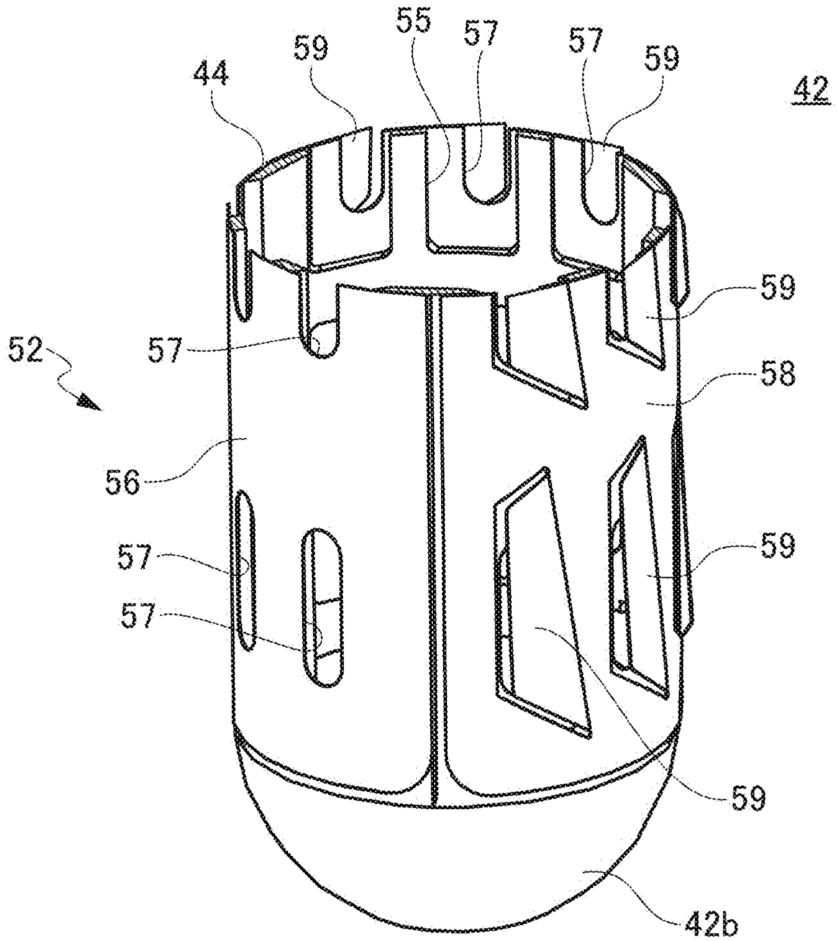
FIG. 10 is a perspective view of a second tube of the inner cylinder when the second tube is cut in parallel to a horizontal plane.

FIG. 10 is a perspective view of the second tube of the inner cylinder in a cross section parallel to the horizontal plane.

In FIG. 10, an inner sheet 56 and an outer sheet 58 are sequentially layered on the outer peripheral surface of the peripheral wall 44 forming the second tube 52. Both the inner sheet 56 and the outer sheet 58 are elements included in the inner cylinder 42.

The inner sheet 56 is positioned between the outer peripheral surface of the peripheral wall 44 and the outer sheet 58 in the radial direction of the inner cylinder 42. Note that, in FIG. the illustration of the outer sheet 58 is omitted on the left side of the drawing in order to make it easier to understand the structure of the second tube 52 of the inner cylinder 42, but the inner sheet 56 and the outer sheet 58 are both disposed over the entire circumference of the peripheral wall 44.

Figure 11:
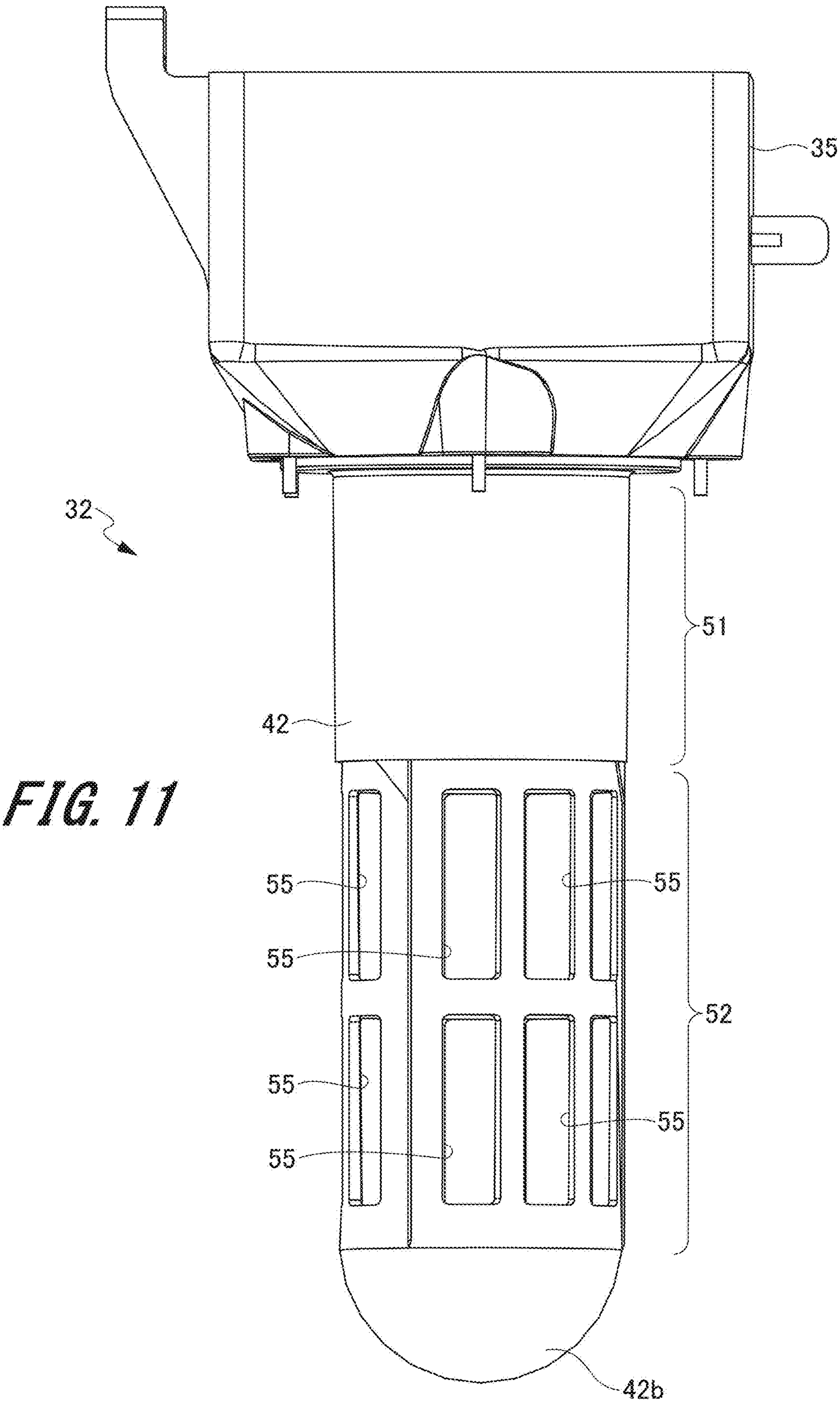
FIG. 11 is a side view illustrating the structure of the cyclone before an inner sheet and an outer sheet are attached to the second tube of the inner cylinder.

FIG. 11 is a side view illustrating the structure of the cyclone before the inner sheet and the outer sheet are attached to the second tube of the inner cylinder.

As illustrated in FIG. 11, a plurality of through-holes 55 is formed in the second tube 52. The plurality of through-holes 55 is provided at predetermined intervals in the circumferential direction of the inner cylinder 42. The plurality of through-holes 55 is provided in upper and lower stages with their positions shifted in the central axis direction of the inner cylinder 42. Each of the through-holes 55 is formed in a rectangular shape elongated in the central axis direction of the inner cylinder 42. Each of the through-holes 55 is provided in a state of penetrating the peripheral wall 48 forming the second tube 52. In contrast, the peripheral wall 48 forming the first tube 51 is not provided with the through-hole 55. That is, the first tube 51 has a structure without holes, and the second tube 52 has a structure with holes.

Figure 12:
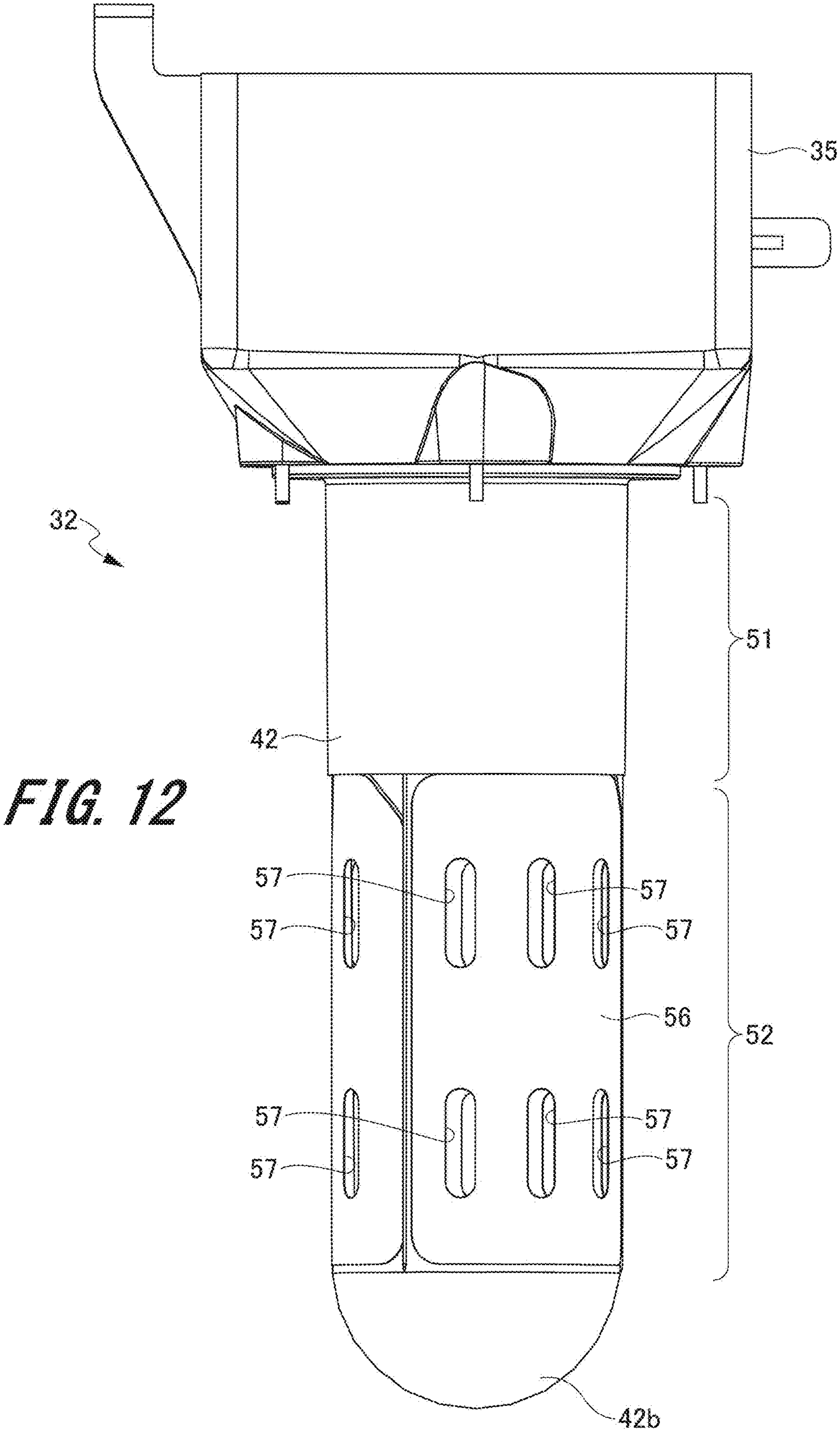
FIG. 12 is a side view illustrating the structure of the cyclone after the inner sheet is attached to the second tube of the inner cylinder.

FIG. 12 is a side view illustrating a structure of the cyclone in a state where the inner sheet is attached to the second tube of the inner cylinder.

In FIG. 12, the inner sheet 56 is affixed to the outer peripheral surface of the second tube 52. The inner sheet 56 is a sheet having a thickness dimension sufficiently smaller than the thickness dimension of the peripheral wall 48 of the inner cylinder 42. The thickness dimension of the inner sheet 56 is preferably ⅓ or less (provided that zero is not included) of the thickness dimension of the peripheral wall 48. A plurality of intake holes 57 is formed in the inner sheet 56. The plurality of intake holes 57 is provided in the inner sheet 56 corresponding to the plurality of through-holes 55 described above. As with the plurality of through-holes 55 described above, the plurality of intake holes 57 is arranged with their positions shifted in the circumferential direction of the inner cylinder 42. Furthermore, as with the plurality of through-holes 55 described above, the plurality of intake holes 57 is arranged with their positions shifted in the central axis direction of the inner cylinder 42.

Figure 13:
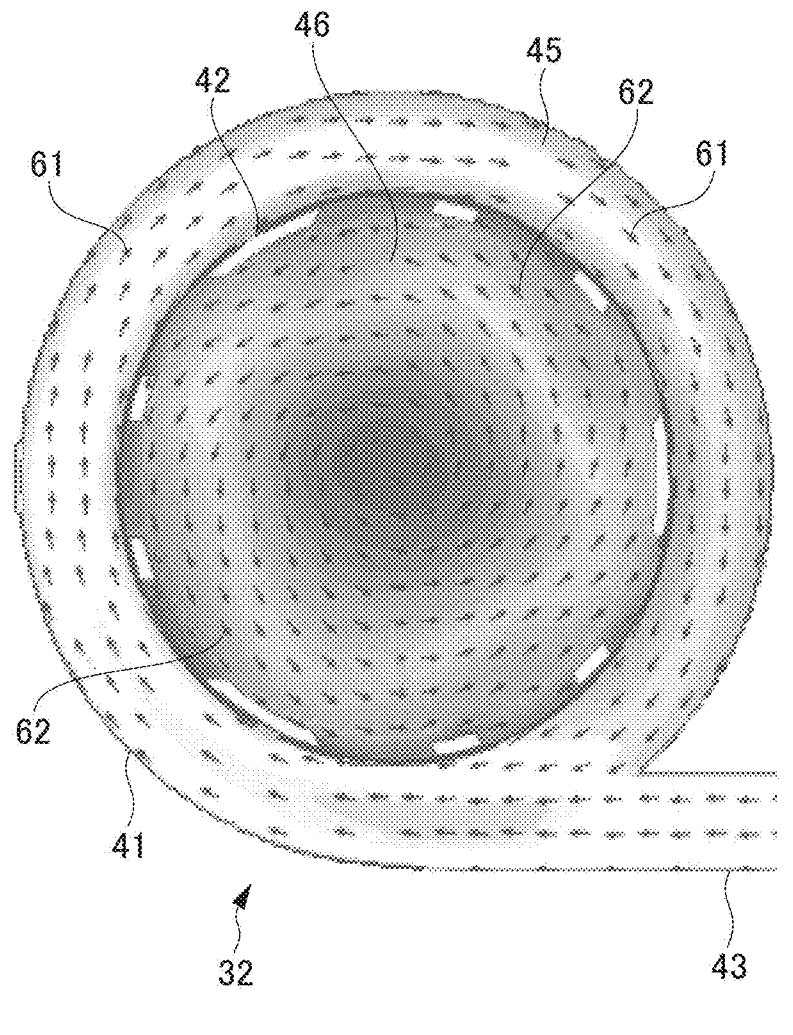
FIG. 13 is a diagram showing a simulated result of a stream of air in a cyclone.

Each of the intake holes 57 is a slit-shaped long hole elongated in the central axis direction of the inner cylinder 42. The intake hole 57 is a hole through which air is taken into the inner cylinder 42. The intake hole 57 is also a hole through which air is taken from the first space 45 into the second space 46. The intake hole 57 is formed in a slit shape so as to intersect the rotating (circling) directions of the first airflow 61 and of the second airflow 62 as illustrated in FIG. 13. The long-side dimension of the intake hole 57 is shorter than the long-side dimension of the through-hole 55, and the short-side direction of the intake hole 57 is shorter than the short-side dimension of the through-hole 55. That is, the opening size of the intake hole 57 is smaller than the opening size of the through-hole 55. The intake hole 57 is disposed on the outer surface side of the peripheral wall 48. As can be seen from FIG. 10, the intake hole 57 is disposed inside the opening edge of the through-hole 55. As a result, in a state where the inner sheet 56 is attached to the inner cylinder 42, a space inside of the inner cylinder 42 and a space outside of the inner cylinder 42 are in a state of communicating with each other via the intake hole 57 having an opening size smaller than that of the through-hole 55. As illustrated in FIG. 8, the position of the intake hole 57 and the position of the discharge port 34 are shifted so as not to overlap each other in the central axis direction of the outer cylinder 41.

FIG. 9 described above illustrates a structure of the cyclone in a state where both the inner sheet and the outer sheet are attached to the second tube of the inner cylinder.

In FIG. 9, an outer sheet 58 is affixed to the outer peripheral surface of the second tube 52. The outer sheet 58 is affixed so as to cover the inner sheet 56. That is, the inner sheet 56 and the outer sheet 58 are layered in this order and affixed to the outer peripheral surface of the second tube 52. A plurality of protrusions 59 is formed on the outer sheet 58. The plurality of protrusions 59 is provided on the outer sheet 58 corresponding to the plurality of through-holes and the plurality of intake holes 57 described above.

Figure 7:
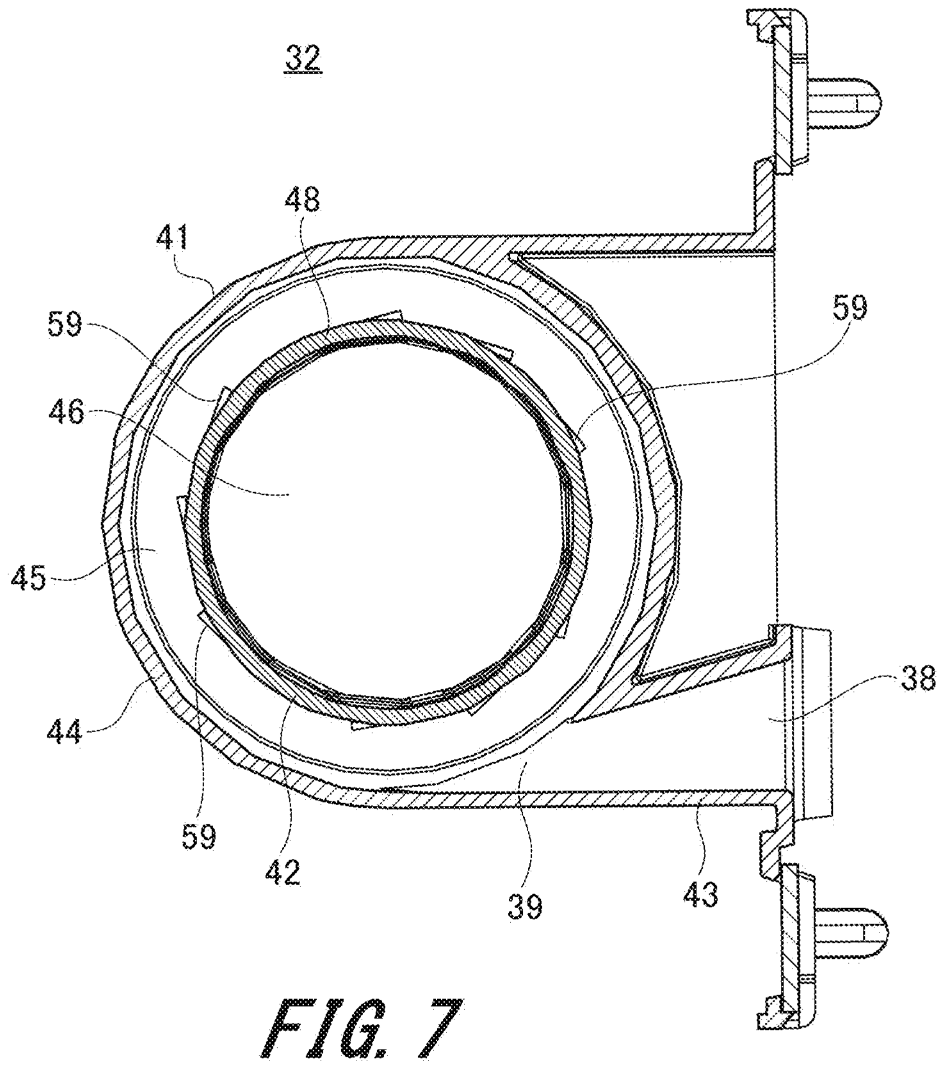
FIG. 7 is a transverse sectional view of the cyclone according to the present embodiment.

As also illustrated in FIG. 7, the protrusion 59 is disposed protruding radially outward from the outer periphery of the inner cylinder 42. Furthermore, as illustrated in FIG. 9, the protrusion 59 is formed in a vane shape having an upper side 59*a*, a lower side 59*b*, a vertical side 59*c*, and an oblique side 59*d*. The protruding size of the protrusion 59 in the vane shape gradually increases from the upstream side to the downstream side of the first airflow 61 described later.

The upper side 59*a* is disposed closer to the discharge port 34 of the nozzle 31 than the lower side 59*b*. The length of the upper side 59*a* is shorter than the length of the lower side 59*b*. The upper side 59*a* is disposed so as to be parallel to the direction of the first airflow formed in the first space 45. The lower side 59*b* is disposed so as to be perpendicular to the direction of the first airflow. The vertical side 59*c* is disposed along the central axis direction of the inner cylinder 42. The oblique side 59*d* is inclined with respect to the central axis direction of the inner cylinder 42. The protrusion 59 is connected to the other part of the outer sheet 58 in the area of the oblique side 59*d*. The protrusion 59 is bent outward from the area of the oblique side 59*d* as a boundary, and the protrusion 59 protrudes radially outward by this bending.

A gap 60 is formed around the protrusion 59. The gap 60 is formed along three sides (59*a*, 59*b*, 59*c*) of the protrusion 59. Furthermore, the gap 60 communicates with the intake hole 57 of the inner sheet 56. The dimension of the gap 60 formed along the upper side 59*a* gradually increases from the oblique side 59*d* toward the vertical side 59*c* in accordance with the bending angle of the protrusion 59. The dimension of the gap 60 formed along the lower side 59*b* also gradually increases from the oblique side 59*d* toward the vertical side 59*c* in accordance with the bending angle of the protrusion 59. The dimension of the gap 60 formed along the vertical side 59*c* increases little by little from the upper side 59*a* toward the lower side 59*b*.

<Operation of Mist Collector>

Next, there will be described the operation of the mist collector including the above configuration.

The mist collector 22 operates by the rotation of the exhaust fan 47 at the time of forming an image when ink is ejected from the inkjet heads 21Y, 21M, 21C, and 21K onto the sheet of paper 15 conveyed by the conveyor drum 20.

By the rotation of the exhaust fan 47, the air containing the ink mist is sucked from the suction port 33 of the nozzle 31 into the nozzle 31. The air sucked into the nozzle 31 flows from the bottom end toward the top end of the nozzle 31, and then is discharged from the discharge port 34. The air discharged from the discharge port 34 is taken into the outer cylinder 41 through the air induction 43 of the cyclone 32.

FIG. 13 is a diagram illustrating a simulated result of a stream of air in the cyclone.

As illustrated in FIG. 13, air taken into the outer cylinder 41 through the air induction 43 forms a first airflow 61 in the first space 45. The first airflow 61 becomes a stream of air that rotates (moves in circles) in clockwise direction in FIG. 13. A part of the air forming the first airflow 61 is taken into the inner cylinder 42 through the intake hole 57 (FIG. 12) of the inner sheet 56 described above. The air taken in through the intake hole 57 forms a second airflow 62 inside the inner cylinder 42. The second airflow 62 becomes a stream of air that rotates (moves in circles) in counterclockwise direction in FIG. 13. In other words, the first airflow 61 and the second airflow 62 rotate in mutually opposite directions. The first airflow 61 and the second airflow 62 each become a spirally rotating airflow.

In the present embodiment, in order to force the first airflow 61 and the second airflow 62 to rotate in mutually opposite directions, the protrusion 59 is disposed on the upstream side of the first airflow 61 in the intake hole 57. The stream of air on the inner peripheral side (in the vicinity of the inner cylinder 42) forming the first airflow 61 is blocked by the presence of the protrusion 59. Furthermore, the air whose stream is blocked by the protrusion 59 turns around the protrusion 59 and is introduced into the intake hole 57, and then is taken into the inner cylinder 42 through the intake hole 57. The direction of the air thus taken into the inner cylinder 42 is reversed by the turnaround described above. Therefore, a second airflow 62 whose rotating direction is opposite to that of the first airflow 61 is formed inside the inner cylinder 42.

As described above, the first airflow 61 and the second airflow 62 are formed inside the cyclone 32, so that the ink mist is separated from the air that has been taken into the cyclone 32 from the nozzle 31. Specifically, a part of the ink mist among the ink mist contained in the air that flows through the first space 45 is subjected to the centrifugal force by the first airflow 61 and strikes the peripheral wall 44 of the outer cylinder 41, thereby being separated (centrifuged) from the air. The ink mist thus separated then moves downward and accumulates at the bottom end 41*b* of the outer cylinder 41.

On the other hand, a part of the ink mist among the ink mist contained in the air flowing from the first space 45 toward the second space 46 strikes the peripheral wall 48 of the inner cylinder 42 or the edge of the intake hole 57 at the time of turning around the protrusion 59, thereby being separated from the air. The ink mist thus separated then moves downward and accumulates at the bottom end 42*b* of the inner cylinder 42.

A part of the ink mist, out of the ink mist contained in the air taken into the inner cylinder 42, moves upward with the second airflow 62 and is captured by the filter 40. The other ink mist is subjected to the centrifugal force by the second airflow 62 and strikes the peripheral wall 48 of the inner cylinder 42, thereby being separated (centrifuged) from the air.

Here, the ink mist contained in the air that is taken into the outer cylinder 41 through the air induction 43 is roughly classified depending on particle size of the droplets into three groups: large droplets of ink mist; medium droplets of ink mist; and small droplets of ink mist. Given that the velocity of the airflow is constant, the centrifugal force applied to the ink mist is proportional to the mass of the ink mist and is inversely proportional to the rotational radius of the airflow. Therefore, a stronger centrifugal force is applied to the ink mist having a large particle size.

Figure 14:
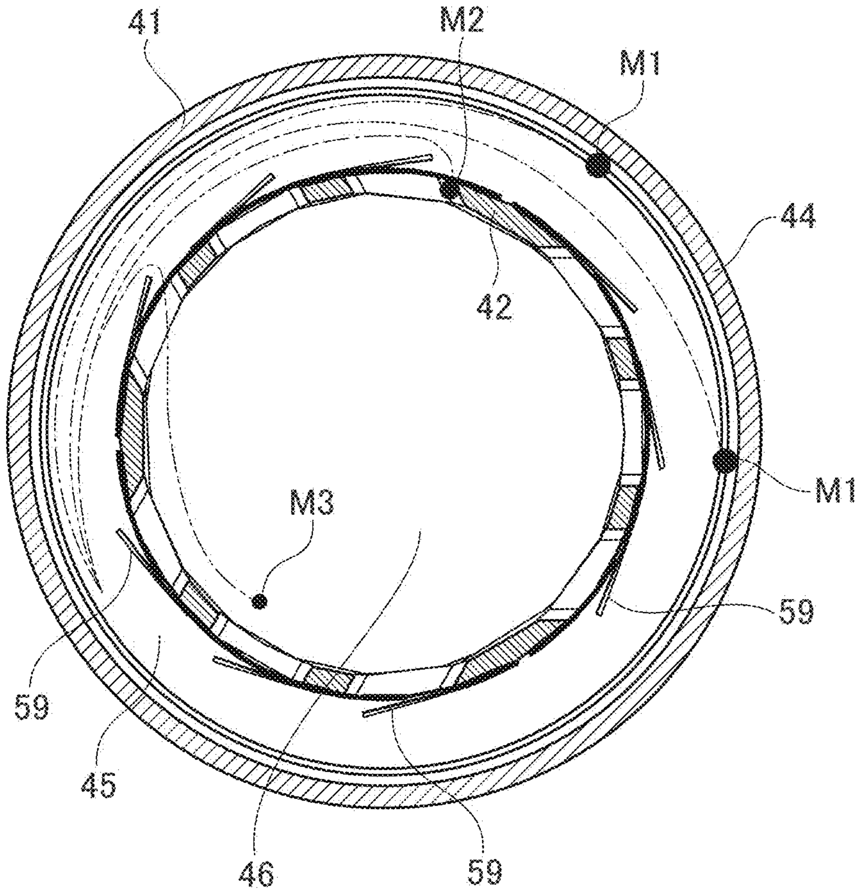
FIG. 14 is a transverse sectional view showing an example of movement trajectories of ink mist having different particle sizes.

FIG. 14 is a transverse sectional view illustrating an example of movement trajectory of ink mist having different particle sizes.

As illustrated in FIG. 14, the large droplet of ink mist M1 is subjected to a centrifugal force in accordance with the mass of the ink mist M1 itself and is brought outward, and then strikes the peripheral wall 44 of the outer cylinder 41. Therefore, the large droplet of ink mist M1 can be separated from the air forming the first airflow 61. However, the medium droplet of ink mist M2 and the small droplet of ink mist M3 cannot be separated.

In the present embodiment, the medium droplet of ink mist M2 and the small droplet of ink mist M3 move with a stream of air that turns around the protrusion 59 and is about to flow from the first space 45 into the second space 46. At this time, the rotational radius of the airflow turning around the protrusion 59 becomes extremely smaller than the rotational radius of the first airflow 61. For example, in a case where the rotational radius of the first airflow 61 is about 30 mm, the rotational radius of the airflow turning around the protrusion 59 is about 1/10 thereof, that is, about 3 mm.

For this reason, a very strong centrifugal force is applied to the medium droplet of ink mist M2 and the small droplet of ink mist M3 at the time of turning around the protrusion 59. Furthermore, the medium droplet of ink mist M2 is subjected to a centrifugal force stronger than that of the small droplet of ink mist M3. As a result, the medium droplet of ink mist M2 strikes the inner cylinder 42 (or the edge of the intake hole 57) at the time of turning around the protrusion 59. Therefore, the medium droplet of ink mist M2 can be separated from the air taken into the second space 46 from the first space 45. The small droplet of ink mist M3 enters the filter 40 together with the second airflow 62, thereby captured by the filter 40. Therefore, the air exhausted from the exhaust port 37 becomes clean air after the ink mist having been removed by the cyclone 32 and the filter 40. The air entering the filter 40 becomes air from which not only the large droplets of ink mist M1 but also the medium droplets of ink mist M2 have been removed.

Figure 15:
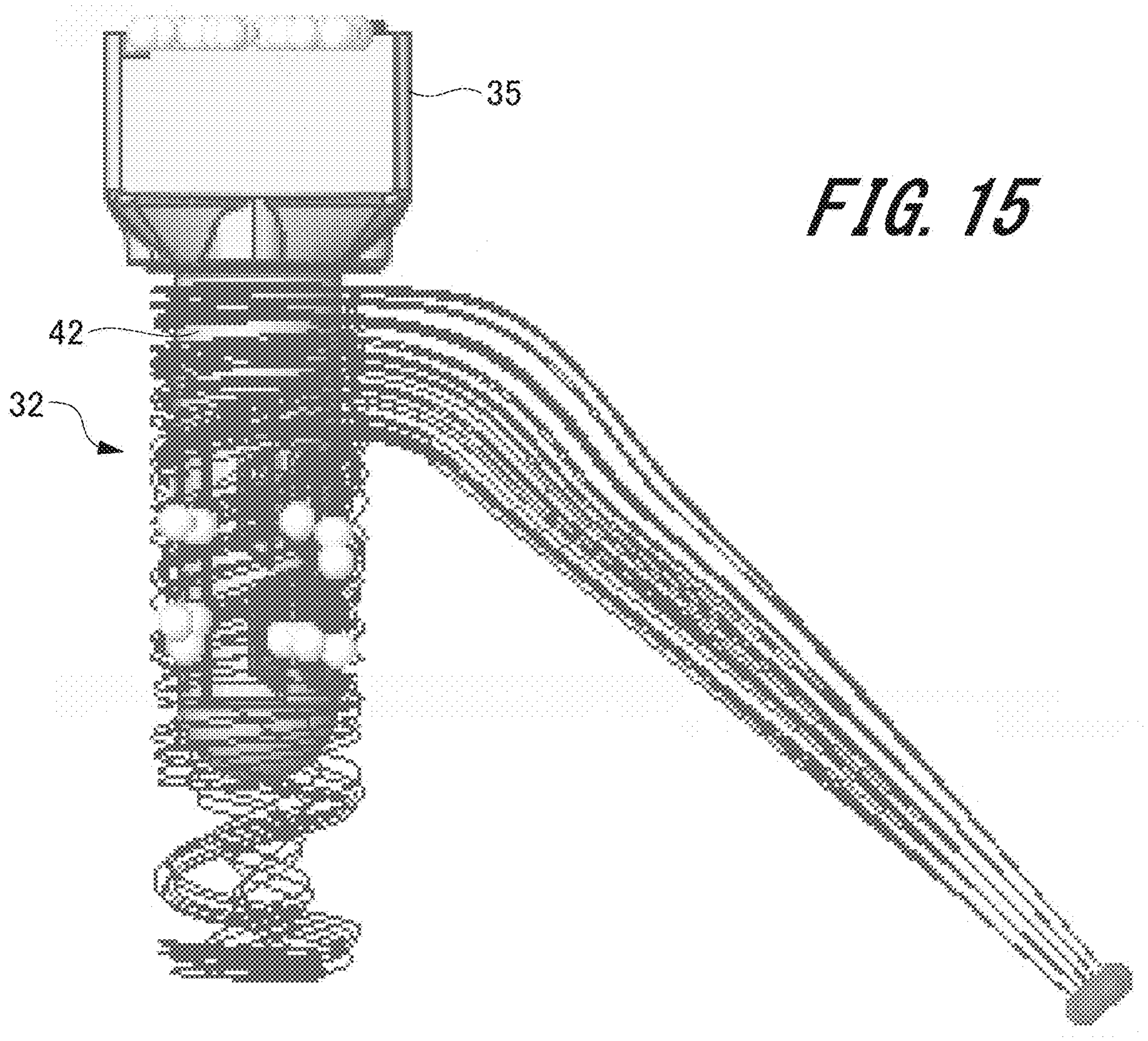
FIG. 15 is a diagram showing a simulation result of particle track in the mist collector according to the present embodiment.

FIG. 15 is a diagram illustrating a simulation result of particle track in the mist collector according to the present embodiment.

As illustrated in FIG. 15, the particles move along the inclination of the nozzle 31 described above, and then move downward while spirally rotating (circling) around the inner cylinder 42. In addition, some particles turn around the protrusion 59 described above and strike the inner cylinder 42 or pass through the intake hole 57 and are taken into the inner cylinder 42. Thereafter, the particles taken into the inner cylinder 42 move upward with the second airflow 62 described above.

As described above, the inkjet recorder 10 according to the present embodiment separates the ink mist from the air by the first airflow 61 formed in the first space 45 and forms the second airflow 62 in the second space 46 by the air taken into the inner cylinder 42 from the intake hole 57 thereby separating the ink mist from the air. As a result, inside the cyclone 32, ink mist with a small particle size, which would not be separated only by the first airflow 61, can also be separated from the air. Therefore, as compared with a case where the ink mist is centrifuged only by the airflow of the first airflow 61, the collection efficiency of the ink mist by the cyclone 32 can be enhanced. As a result, the amount of mist captured by the filter 40 per unit time can be reduced, and the exchange frequency of the filter 40 can be lessened.

In the present embodiment, the intake hole 57 is formed in a slit shape so as to intersect the direction of the first airflow 61. As a result, a wide opening area of the intake hole 57 can be ensured while maintaining a small rotational radius of the airflow entering the second space 46 from the first space 45. Therefore, a strong centrifugal force can be applied to the ink mist with a small particle size thereby separating the ink mist from the air. In addition, the flow path resistance at the time when air passes through the intake hole 57 can be kept small.

In the present embodiment, the protrusion 59 is formed in a vane shape. As a result, an influx of air from the sides (the upper side 59*a* and the lower side 59*b*) of the protrusion 59 can be suppressed at the time when air is taken into the second space 46 from the first space 45. For this reason, a lot more ink mist is allowed to strike the peripheral wall 48 of the inner cylinder 42 or the edge of the intake hole 57, thereby enabling to enhance the effect of centrifugal separation.

Furthermore, in the present embodiment, the upper side 59*a* closer to the discharge port 34, out of the upper side 59*a* and the lower side 59*b* of the protrusion 59, has a length shorter than the length of the lower side 59*b* farther away from the discharge port 34. As a result, there can be suppressed an influx of air from the gap 60 of the upper side 59*a* into the inner cylinder 42.

In the present embodiment, the upper side 59*a* closer to the discharge port 34, out of the upper side 59*a* and the lower side 59*b* of the protrusion 59, has a smaller angle of inclination with respect to the first airflow 61 than that of the lower side 59*b* farther away from the discharge port 34. As a result, there can be suppressed an influx of air from the gap 60 of the upper side 59*a* into the inner cylinder 42.

In the present embodiment, the upper side 59*a* that is close to the discharge port 34 is disposed so as to be parallel to the direction of the first airflow 61 (see FIG. 15). As a result, the influx of air from the gap 60 of the upper side 59*a* into the inner cylinder 42 can be more effectively suppressed.

In the present embodiment, the lower side 59*b* that is far from the discharge port 34 is disposed so as to be perpendicular to the direction of the first airflow 61 (see FIG. 15). As a result, the influx of air from the gap 60 of the lower side 59*b* into the inner cylinder 42 can be more effectively suppressed.

In the present embodiment, the position of the intake hole 57 and the position of the discharge port 34 are shifted from each other so as not to overlap each other in the central axis direction of the outer cylinder 41. As a result, there can be provided a region where the ink mist is centrifuged by the first airflow 61 formed in the first space 45.

In the present embodiment, the inner cylinder 42 is provided with a plurality of intake holes 57. As a result, the flow path resistance can be kept small as compared with a case where single intake hole 57 is provided in the inner cylinder 42.

In the present embodiment, there is adopted a configuration in which the plurality of nozzles 31 and the plurality of cyclones 32 both are arranged side by side in the paper width direction X. As a result, the suction power of air can be made uniform in the paper width direction X.

Note that in the present embodiment, the inner sheet 56 and the outer sheet 58 are provided on the second tube 52 of the inner cylinder 42, but there may be adopted a configuration in which the inner sheet 56 and/or the outer sheet 58 is not provided.

For instance, a configuration in which the intake hole 57 is formed directly in the peripheral wall 48 forming the second tube 52 can be conceived as a configuration in which neither the inner sheet 56 nor the outer sheet 58 is provided in the second tube 52. In the case of adapting this configuration, the first airflow 61 formed in the first space 45 and the second airflow 62 formed in the second space 46 become airflows rotating in the same direction. A part of the ink mist among the ink mist contained in the air about to flow into the second space 46 from the first space 45 strikes the edge of the intake hole 57 of the peripheral wall 48 thereby separated from the air. In this respect, the situation is the same in a case where only the inner sheet 56 is disposed on the second tube 52 of the inner cylinder 42.

In a case of adapting a configuration in which the inner sheet 56 is provided on the second tube 52, the inner sheet 56 is extremely thin compared to the peripheral wall 48, and hence the ink mist is less likely to accumulate at the edge of the intake hole 57 in a case where the ink mist strikes the edge of the intake hole 57, and even if the ink mist accumulates, a mass of the ink mist can be peeled off by using the power of the air (wind pressure or the like) passing through the intake hole 57.

In the case of adapting the configuration in which the inner sheet 56 and the outer sheet 58 are provided on the second tube 52, the air is allowed to turn around by the protrusion 59, whereby the rotational radius of the airflow can be reduced, and a stronger centrifugal force can be applied to the ink mist. Therefore, the ink mist having a small particle size that would not be separated only by the first airflow 61 can be more reliably separated.

In the above-described embodiments, there has been described with an example of the inkjet recorder 10 that forms an image by ejecting ink from each of the inkjet heads 21Y, 21M, 21C, and 21K onto the sheet of paper 15 conveyed with being wound around the conveyor drum but the present invention is not limited thereto. For example, the present invention is also applicable to an inkjet recorder that forms an image by ejecting ink from each inkjet head onto a sheet of paper horizontally conveyed along a platen (not illustrated).

Although embodiments of the present invention have been described and illustrated in detail, the disclosed embodiments are made for purposes of illustration and example only and not limitation. The scope of the present invention should be interpreted by terms of the appended claims.

DESCRIPTION OF REFERENCE NUMERALS

10 . . . inkjet recorder
22 . . . mist collector
31 . . . nozzle
32 . . . cyclone
33 . . . suction port
34 . . . discharge port
41 . . . outer cylinder
42 . . . inner cylinder
57 . . . intake hole
59 . . . protrusion
59*a* . . . upper side
59*b* . . . lower side
61 . . . first airflow
62 . . . second airflow

The invention claimed is:

1. An inkjet recorder comprising a mist collector that collects ink mist, wherein the mist collector comprises:

a nozzle through which air containing the ink mist is sucked from a suction port and discharged from a discharge port; and a cyclone that includes an outer cylinder to which the discharge port of the nozzle is connected, and an inner cylinder disposed inside the outer cylinder, the cyclone forming a first airflow between the outer cylinder and the inner cylinder by air taken into the outer cylinder through the discharge port, thereby separating the ink mist from the air, and the inner cylinder includes an intake hole through which air is taken into the inner cylinder and forms a second airflow inside the inner cylinder by air taken therein through the intake hole, thereby separating the ink mist from the air;

wherein the inner cylinder includes a protrusion on an upstream side of the first airflow in the intake hole.

2. The inkjet recorder according to claim 1, wherein the intake hole is formed in a slit shape so as to intersect a direction of the first airflow.

3. The inkjet recorder according to claim 1, wherein the protrusion allows a part of air forming the first airflow to turn around and to be introduced into the intake hole.

4. The inkjet recorder according to claim 1, wherein the protrusion is formed in a vane shape protruding radially outward from an outer periphery of the inner cylinder.

5. The inkjet recorder according to claim 4, wherein a protruding size of the protrusion gradually increases from the upstream side toward a downstream side of the first airflow.

6. The inkjet recorder according to claim 4, wherein the protrusion in the vane shape has an upper side and a lower side, and one of the upper side and the lower side closer to the discharge port has a length which is shorter than a length of another of the upper side and the lower side farther away from the discharge port.

7. The inkjet recorder according to claim 4, wherein the protrusion in the vane shape has an upper side and a lower side, and one of the upper side and the lower side closer to the discharge port is inclined at a smaller angle of inclination with respect to the first airflow than another of the upper side and the lower side farther away from the discharge port.

8. The inkjet recorder according to claim 7, wherein the one side closer to the discharge port is disposed so as to be parallel to a direction of the first airflow.

9. The inkjet recorder according to claim 7, wherein the another side farther away from the discharge port is disposed so as to be perpendicular to a direction of the first airflow.

10. The inkjet recorder according to claim 1, wherein the mist collector includes a plurality of the nozzles and a plurality of the cyclones both arranged side by side in a direction orthogonal to a conveyance direction of a recording medium.

11. An inkjet recorder comprising a mist collector that collects ink mist, wherein the mist collector comprises:

a nozzle through which air containing the ink mist is sucked from a suction port and discharged from a discharge port; and a cyclone that includes an outer cylinder to which the discharge port of the nozzle is connected, and an inner cylinder disposed inside the outer cylinder, the cyclone forming a first airflow between the outer cylinder and the inner cylinder by air taken into the outer cylinder through the discharge port, thereby separating the ink mist from the air, and the inner cylinder includes an intake hole through which air is taken into the inner cylinder and forms a second airflow inside the inner cylinder by air taken therein through the intake hole, thereby separating the ink mist from the air;

wherein a position of the intake hole and a position of the discharge port are shifted from each other so as not to overlap each other in a central axis direction of the outer cylinder.

12. An inkjet recorder comprising a mist collector that collects ink mist, wherein the mist collector comprises:

a nozzle through which air containing the ink mist is sucked from a suction port and discharged from a discharge port; and a cyclone that includes an outer cylinder to which the discharge port of the nozzle is connected, and an inner cylinder disposed inside the outer cylinder, the cyclone forming a first airflow between the outer cylinder and the inner cylinder by air taken into the outer cylinder through the discharge port, thereby separating the ink mist from the air, and the inner cylinder includes an intake hole through which air is taken into the inner cylinder and forms a second airflow inside the inner cylinder by air taken therein through the intake hole, thereby separating the ink mist from the air;

wherein the inner cylinder includes a plurality of the intake holes.

13. The inkjet recorder according to claim 12, wherein the plurality of the intake holes is arranged with their positions shifted in a circumferential direction of the inner cylinder.

14. The inkjet recorder according to claim 12, wherein the plurality of the intake holes is arranged with their positions shifted in a central axis direction of the inner cylinder.

* * * * *